US009795014B2

(12) United States Patent
Altonen et al.

(10) Patent No.: US 9,795,014 B2
(45) **Date of Patent: *Oct. 17, 2017**

(54) REMOTE CONTROL FOR A WIRELESS LOAD CONTROL SYSTEM

(71) Applicant: Lutron Electronics Co., Inc., Coopersburg, PA (US)

(72) Inventors: Gregory Altonen, Easton, PA (US); Edward M. Felegy, Jr., Macungie, PA (US); Elliot G. Jacoby, Jr., Glenside, PA (US); Gregory M. Snyder, Germansville, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/092,205

(22) Filed: Apr. 6, 2016

(65) Prior Publication Data

US 2016/0219682 A1 Jul. 28, 2016

Related U.S. Application Data

(63) Continuation of application No. 14/686,118, filed on Apr. 14, 2015, now Pat. No. 9,361,790, which is a (Continued)

(51) Int. Cl.
*H04L 17/02* (2006.01)
*H05B 37/02* (2006.01)

(Continued)

(52) U.S. Cl.
CPC ......... *H05B 37/0272* (2013.01); *G08C 17/02* (2013.01); *H01H 9/025* (2013.01); *H05B 39/088* (2013.01)

(58) Field of Classification Search
USPC .......................................................... 341/176
See application file for complete search history.

(56) References Cited

U.S. PATENT DOCUMENTS 4,247,850 A 1/1981 Marcus
4,728,949 A 3/1988 Platte et al.

(Continued)

FOREIGN PATENT DOCUMENTS

CN 2596671 Y 12/2003
DE 10127997 C1 10/2002

(Continued)

OTHER PUBLICATIONS

Chinese Office Action and Search Report issued in Chinese Patent Application No. 200980120521.8 dated Feb. 5, 2013 and English translation of the Search Report and text of the Office Action.

(Continued)

*Primary Examiner* — Rexford Barnie
*Assistant Examiner* — Dru Parries
(74) *Attorney, Agent, or Firm* — Ostrolenk Faber LLP

(57) ABSTRACT

A remote control for a wireless load control system, the remote control comprising: a housing having a front surface and an outer periphery defined by a length and a width; an actuator provided at the front surface of the housing; a wireless transmitter contained within the housing; and a controller contained within the housing and coupled to the wireless transmitter for causing transmission of a wireless signal in response to an actuation of the actuator, the wireless transmitter and the controller adapted to be powered by a battery contained within the housing; wherein the length and the width of the housing are slightly smaller than a length and a width of a standard opening of a faceplate, respectively, such that the outer periphery of the housing is adapted to be received within the standard opening of the (Continued)

faceplate when the housing and the faceplate are mounted to a vertical surface.

23 Claims, 14 Drawing Sheets

Related U.S. Application Data continuation of application No. 13/680,310, filed on Nov. 19, 2012, now Pat. No. 9,024,800, which is a continuation of application No. 12/399,126, filed on Mar. 6, 2009, now Pat. No. 8,330,638.

(60) Provisional application No. 61/042,421, filed on Apr. 4, 2008.

(51) Int. Cl.
*H01H 9/02* (2006.01)
*H05B 39/08* (2006.01)
*G08C 17/02* (2006.01)

(56) References Cited

U.S. PATENT DOCUMENTS

| | | | |
|---|---|---|---|
| 4,835,343 | A | 5/1989 | Graef et al. |
| 4,860,950 | A | 8/1989 | Reeser et al. |
| 4,864,588 | A | 9/1989 | Simpson et al. |
| 4,896,713 | A | 1/1990 | Rademacher |
| 5,192,042 | A | 3/1993 | Wotring et al. |
| 5,239,205 | A | 8/1993 | Hoffman et al. |
| 5,458,311 | A | 10/1995 | Holbrook |
| 5,460,347 | A | 10/1995 | Schacher |
| 5,486,852 | A | 1/1996 | Arai |
| 5,526,245 | A | 6/1996 | Davis et al. |
| 5,587,704 | A | 12/1996 | Foster |
| 5,982,103 | A | 11/1999 | Mosebrook et al. |
| 6,120,262 | A | 9/2000 | McDonough et al. |
| 6,124,822 | A | 9/2000 | Wu |
| 6,174,073 | B1 | 1/2001 | Regan et al. |
| D439,220 | S | 3/2001 | Mayo et al. |
| 6,545,434 | B2 | 4/2003 | Sembhi et al. |
| 6,680,669 | B1 | 1/2004 | Terry |
| 6,769,658 | B2 | 8/2004 | Stokes et al. |
| D496,335 | S | 9/2004 | Spira |
| D518,447 | S | 4/2006 | Spira |
| 7,023,357 | B2 | 4/2006 | Fu et al. |
| 7,142,932 | B2 | 11/2006 | Spira et al. |
| 7,318,653 | B2 | 1/2008 | Chien |
| 2005/0275969 | A1 | 12/2005 | Kinouchi et al. |
| 2005/0280598 | A1 | 12/2005 | Webb et al. |
| 2006/0044154 | A1 | 3/2006 | Liao |
| 2006/0066151 | A1 | 3/2006 | Hatemata |
| 2006/0072317 | A1 | 4/2006 | Noordhoek |
| 2006/0229040 | A1 | 10/2006 | Hofer et al. |
| 2007/0241929 | A1 | 10/2007 | Marchetto |
| 2007/0272044 | A1 | 11/2007 | Huang |
| 2017/0181256 | A1 | 6/2017 | Altonen et al. |

FOREIGN PATENT DOCUMENTS

| | | |
|---|---|---|
| EP | 1265471 | 12/2002 |
| FR | 5458311 | 10/1995 |

OTHER PUBLICATIONS

Canadian Office Action issued in Canadian Patent Application No. 2,720,022 dated Aug. 2, 2012.
Canadian Office Action issued in Canadian Patent Application No. 2,720,022 dated Sep. 3, 2013.
Mexican Office Action dated Dec. 6, 2011 and Letter from Mexican associate dated Jan. 30, 2012 forwarding the Mexican Office Action including discussion of relevancy thereof.
Mexican Office Action dated Oct. 19, 2011 and Letter from Mexican associate dated Nov. 14, 2011 forwarding the Mexican Office Action including discussion of relevancy thereof.
Mexican Office Action dated Jun. 4, 2012 and Letter from Mexican associate dated Jun. 27, 2012 forwarding the Mexican Office Action including discussion of relevancy thereof.
European Patent Office, International Preliminary Report on Patentability for International Application No. PCT/US09/02053, dated Apr. 6, 2011, 11 pages.
European Patent Office, International Search Report and Written Opinion for International Application No. PCT/US2009/002053, dated Jul. 29, 2009, 11 pages.
Lutron Electronics Co., Inc., AuroRa Security Installation Guide, Jan. 2007, front cover, pp. 1, 2, 15, 18, rear cover.
Lutron Electronics Co., Inc., RadioRA Visor Control Transmitter Installation Instruction Sheet, Nov. 2001, 2 pages.
Lutron Electronics Co., Inc., Homeworks Visor Control Transmitter Installation Instructio nSheet, Jul. 2003, 2 pages.
Lutron Electronics Co., Inc., Spacer System Controls Specification Submittal Sheet, Oct. 2001, pp. 1, 2, 7, 16.
Lutron Electronics Co., Inc., Radio Touch Control System Installation and Maintenance Guide, Mar. 2007, pp. 1, 2, 15, 48.
Lutron Electronics Co., Inc., Maestro Wireless Remote Lighting Control Brochure, Sep. 2007, 2 pages.
Cooper Wiring Devices, Aspire RF Battery Operated Wireless Switch/Dimmer Product Specifications, 2008, 2 pages.

REMOTE CONTROL FOR A WIRELESS LOAD CONTROL SYSTEM

RELATED APPLICATIONS

This application is a continuation of U.S. Ser. No. 14/686,118, filed Apr. 14, 2015 entitled REMOTE CONTROL FOR A WIRELESS LOAD CONTROL SYSTEM (As Amended), which is a continuation of U.S. Ser. No. 13/680,310, filed Nov. 19, 2012, now U.S. Pat. No. 9,024,800, issued May 5, 2015 entitled WIRELESS BATTERY-POWERED REMOTE CONTROL HAVING MULTIPLE MOUNTING MEANS which is a continuation of U.S. Ser. No. 12/399,126, filed Mar. 6, 2009, now U.S. Pat. No. 8,330,638, issued Dec. 11, 2012 WIRELESS BATTERY-POWERED REMOTE CONTROL HAVING MULTIPLE MOUNTING MEANS which claims priority from commonly-assigned U.S. Provisional Application Ser. No. 61/042,421, filed Apr. 4, 2008, the entire disclosure of which is hereby incorporated by reference.

BACKGROUND OF THE INVENTION

Field of the Invention

The present invention relates to a wireless load control system for controlling the amount of power delivered to an electrical load from a source of alternating-current (AC) power, and more particularly, to a remote control for a radio-frequency (RF) lighting control system that can be mounted in a plurality of different ways, for example, in the opening of a standard-opening faceplate, such as, a Designer-style faceplate.

Description of the Related Art

Control systems for controlling electrical loads, such as lights, motorized window treatments, and fans, are known. Such control systems often use radio-frequency (RF) transmission to provide wireless communication between the control devices of the system. One example of an RF lighting control system is disclosed in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

The RF lighting control system of the '442 patent includes wall-mounted load control devices (e.g., dimmers), and a plurality of remote control devices (e.g., table-top and wall-mounted master controls), and car visor controls. The control devices of the RF lighting control system include RF antennas adapted to transmit and receive the RF communication signals that provide for communication between the control devices of the lighting control system. To prevent interference with other nearby RF lighting control systems located in close proximity, the control devices of the RF lighting control system stores in memory and uses an identical house code (i.e., a house address). Each of the control devices is also assigned a unique device address to allow for the transmission of the RF communication signals between specific control devices. The lighting control system also comprises signal repeaters, which help to ensure error-free communication by repeating the RF signals to ensure that every device of the system reliably receives the RF signals.

Each of the load control devices includes a user interface and an integral dimmer circuit for controlling the intensity of an attached lighting load. The user interface has a pushbutton actuator for providing on/off control of the attached lighting load and a raise/lower actuator for adjusting the intensity of the attached lighting load. The load control devices may be programmed with a preset lighting intensity that may be recalled later in response to an actuation of a button of the user interface or a received RF signal.

The table-top and wall-mounted master controls each have a plurality of buttons and are operable to transmit RF signals to the load control devices to control the intensities of the lighting loads. Each of the table-top and wall-mounted master controls may also comprise one or more visual indicators, e.g., light-emitting diodes (LEDs), for providing feedback to a user in response to a received RF signal. The car visor controls may be clipped to the visor of an automobile and include three buttons for respectively controlling the lighting loads to one of a maximum intensity, a minimum intensity (i.e., off), and a preset lighting level.

In order to mount a master control on a table top, to a wall, or to a car visor, the control system must comprise three separate control devices (i.e., the table-top master control, the wall-mounted master control, and the car visor control). Therefore, there is a need for a single remote control device that may be mounted on a table top, to a wall, or to a car visor.

SUMMARY OF THE INVENTION

According to an embodiment of the present invention, a remote control for a wireless load control system comprises a controller, a radio-frequency transmitter coupled to the controller, a battery coupled to provide power to the controller and the radio-frequency transmitter, and a housing containing the controller, the radio-frequency transmitter, and the battery. The housing has a length and a width slightly smaller than the length and the width of an opening of a standard faceplate, respectively, such that the housing is adapted to be received within the opening of the standard faceplate.

According to another embodiment of the present invention, a system for controlling the amount of power delivered to an electrical load from an AC power source comprises a standard designer-style multi-gang faceplate having first and second openings of the same standard size, a wall-mounted designer-style load control device mounted to an electrical wallbox provided in a wall, and a remote control device mounted to the wall immediately adjacent the electrical wallbox. The load control device is coupled in series electrical connection between the source and the load for controlling the amount of power delivered to the load. The load control device comprises a bezel having a length and a width slightly smaller than the length and the width of the first opening of the faceplate, respectively. The remote control device comprises a controller, a radio-frequency transmitter coupled to the controller, a battery adapted to provide power to the controller and the radio-frequency transmitter, and a housing containing the controller, the wireless transmitter circuit, and the battery. The housing has a length and a width slightly smaller than the length and the width of the second opening of the faceplate, respectively. The faceplate is mounted such that the bezel of the load control device is received within the first opening of the faceplate and the housing of the remote control device is adapted to be received within the second opening of the faceplate.

According to another aspect of the present invention, a system for mounting a remote control for a wireless load control system comprises a housing, a base portion, a clip assembly, and a slide-mount plate. The remote control comprises a controller, a radio frequency transmitter coupled to the controller, and a battery adapted to provide power to the controller and the radio-frequency transmitter, which are all contained within the housing. The housing comprises a slide receiving portion, and an outer periphery having a length and a width slightly smaller than the length and the width of an opening of a standard faceplate, respectively. The base portion has an extension adapted to be received in the slide-receiving portion, and has a substantially flat surface for resting on a substantially flat horizontal surface. The clip assembly comprises a clip and a plate portion adapted to be received in the slide-receiving portion. The slide-mount plate is adapted to be received in the slide-receiving portion of the housing and is adapted to be fastened to a substantially flat vertical surface to mount the housing to the surface, such that the periphery of the housing is sized to fit within the opening of the standard faceplate.

In addition, a method of mounting a remote load control device to a substantially flat vertical surface is described herein. The method comprises the steps of: (1) fastening a housing of the remote load control device to the surface; and (2) attaching a faceplate to the remote load control device, where the faceplate has a standard-sized opening having dimensions slightly larger than the dimensions of the outer periphery of the housing of the remote load control device.

According to yet another embodiment of the present invention, a system for controlling the amount of power delivered to an electrical load from an AC power source comprises a standard designer-style multi-gang faceplate having first and second openings of the same standard size, a wall-mounted designer-style load control device mounted to an electrical wallbox provided in a wall, and a remote control device mounted to the wall immediately adjacent the electrical wallbox. The load control device is coupled in series electrical connection between the source and the load for controlling the amount of power delivered to the load. The load control device comprises a bezel having a length and a width slightly smaller than the length and the width of the first opening of the faceplate, respectively. The remote control device comprises a controller, a radio-frequency transmitter coupled to the controller, a battery adapted to provide power to the controller and the radio-frequency transmitter, and a housing containing the controller, the wireless transmitter circuit, and the battery. The housing has a length and a width slightly smaller than the length and the width of the second opening of the faceplate, respectively. The faceplate is mounted such that the bezel of the load control device is received within the first opening of the faceplate and the housing of the remote control device is adapted to be received within the second opening of the faceplate.

Other features and advantages of the present invention will become apparent from the following description of the invention that refers to the accompanying drawings.

DETAILED DESCRIPTION OF THE INVENTION

Figure 1:
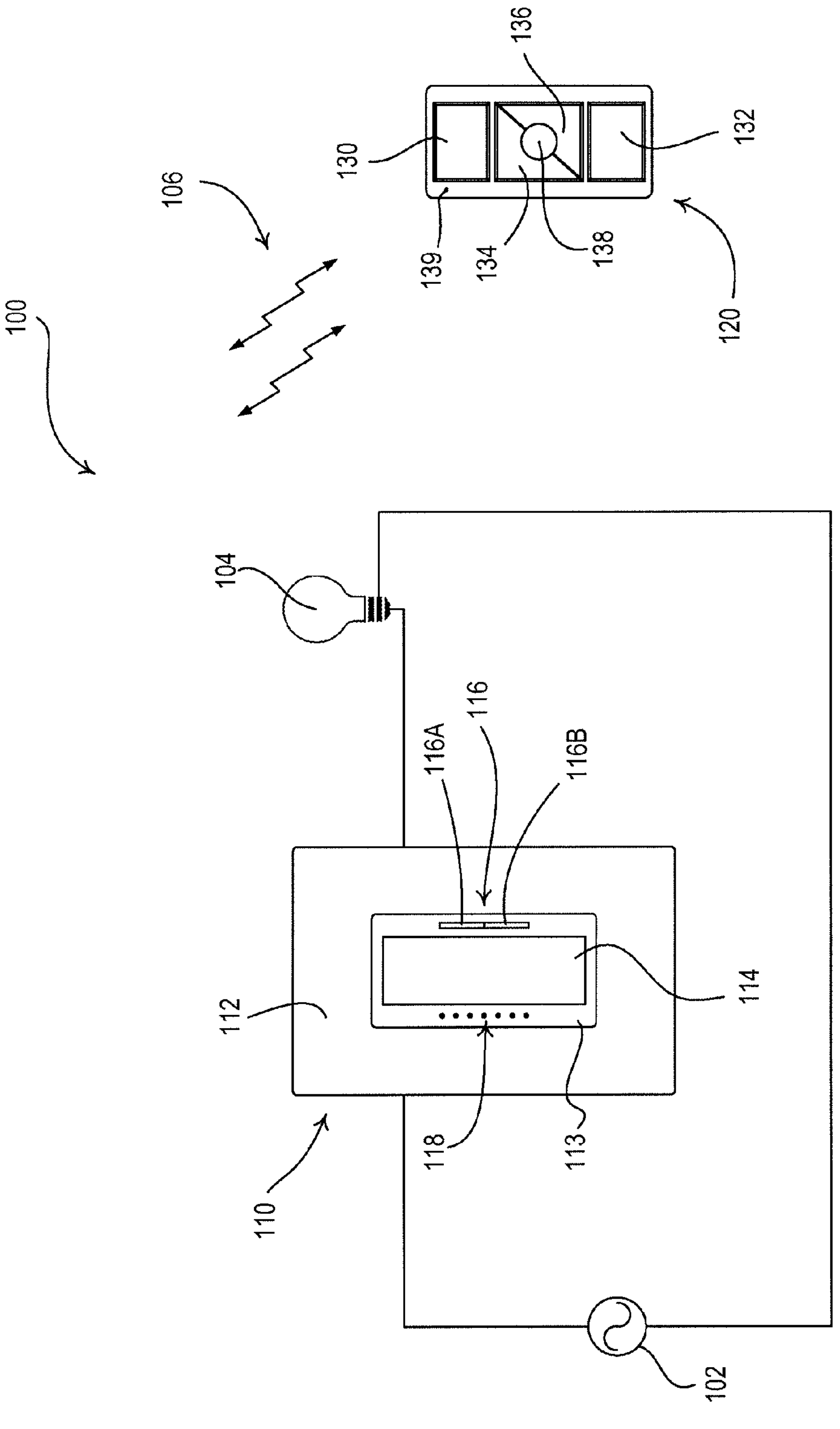
FIG. 1 is a simple diagram of an RF lighting control system comprising a dimmer switch and a remote control.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of an RF load control system 100 comprising a remotely-controllable load control device (e.g., a dimmer switch 110) and a remote control 120. The dimmer switch 110 is adapted to be wall-mounted in a standard electrical wallbox. The dimmer switch 110 is coupled in series electrical connection between an AC power source 102 and an electrical lighting load 104 for controlling the amount of power delivered to the lighting load. The dimmer switch 110 comprises a faceplate 112 and a bezel 113 received in an opening of the faceplate. Alternatively, the RF lighting control system 100 may comprise another type of remotely-controllable load control device, for example, a remotely-controllable electronic dimming ballast, a motor control device, or a motorized window treatment, such as, a roller shade or a drapery.

The dimmer switch 110 comprises a toggle actuator 114 (i.e., a control button) and an intensity adjustment actuator 116 (e.g., a rocker switch). Actuations of the toggle actuator 114 toggle, i.e., alternately turn off and on, the lighting load

104. The dimmer switch 110 may be programmed with a lighting preset intensity (i.e., a "favorite" intensity level), such that the dimmer switch is operable to control the intensity of the lighting load 104 to the preset intensity when the lighting load is turned on by an actuation of the toggle actuator 114. Actuations of an upper portion 116A or a lower portion 116B of the intensity adjustment actuator 116 respectively increase or decrease the amount of power delivered to the lighting load 104 and thus increase or decrease the intensity of the lighting load 104.

A plurality of visual indicators 118, e.g., light-emitting diodes (LEDs), are arranged in a linear array on the left-side of the bezel 113. The visual indicators 118 are illuminated to provide feedback of the present intensity of the lighting load 104. The dimmer switch 110 illuminates one of the plurality of visual indicators 118, which is representative of the present light intensity of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

Figure 2A:
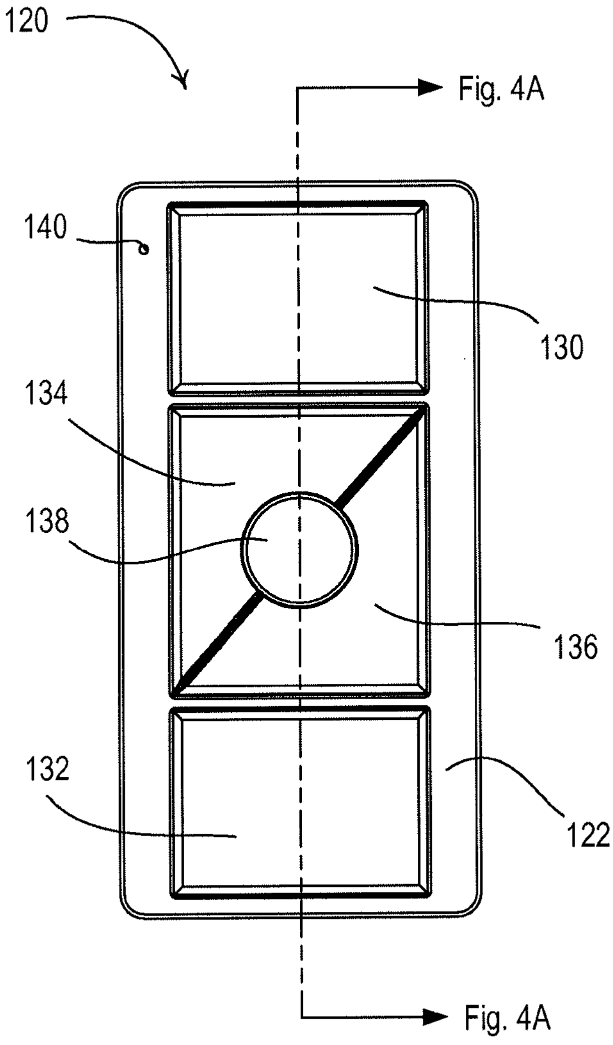
FIG. 2A is a front view of the remote control of the lighting control system of FIG. 1.
Figure 2B:
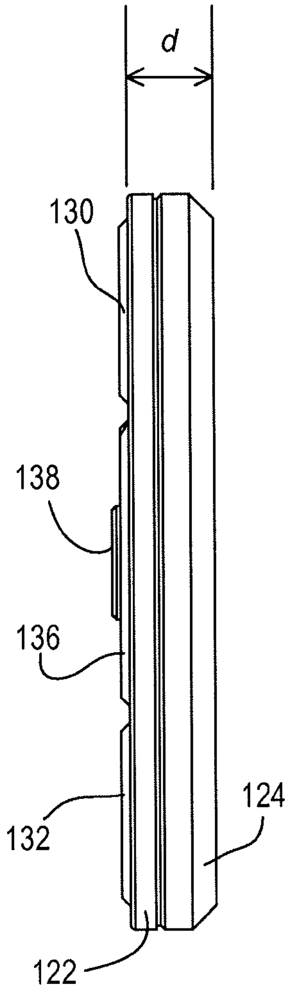
FIG. 2B is a right-side view of the remote control of the lighting control system of FIG. 1.

FIG. 2A is an enlarged front view and FIG. 2B is a right-side view of the remote control 120. The remote control 120 comprises a housing that includes a front enclosure portion 122 and a rear enclosure portion 124. The remote control 120 further comprises a plurality of actuators (i.e., an on button 130, an off button 132, a raise button 134, a lower button 136, and a preset button 138). The remote control 120 also comprises a visual indicator 140, which is illuminated in response to the actuation of one of the buttons 130-138. The remote control 120 transmits packets (i.e., messages) via RF signals 106 (i.e., wireless transmissions) to the dimmer switch 110 in response to actuations of any of the actuators. A packet transmitted by the remote control 120 includes, for example, a preamble, a serial number associated with the remote control, and a command (e.g., on, off, or preset), and comprises 72 bits. In order to meet the standards set by the FCC, packets are transmitted such that there is not less than a predetermined time period between two consecutive packets, for example, approximately 100 msec.

During a setup procedure of the RF load control system 100, the dimmer switch 110 is associated with one or more remote controls 120. The dimmer switch 110 is then responsive to packets containing the serial number of the remote control 120 to which the dimmer switch is associated. The dimmer switch 110 is operable to turn on and to turn off the lighting load 104 in response to an actuation of the on button 130 and the off button 132, respectively. The dimmer switch 110 is operable to control the lighting load 104 to the preset intensity in response to an actuation of the preset button 138. The dimmer switch 110 may be associated with the remote control 120 during a manufacturing process of the dimmer switch and the remote control, or after installation of the dimmer switch and the remote control.

Figure 3A:
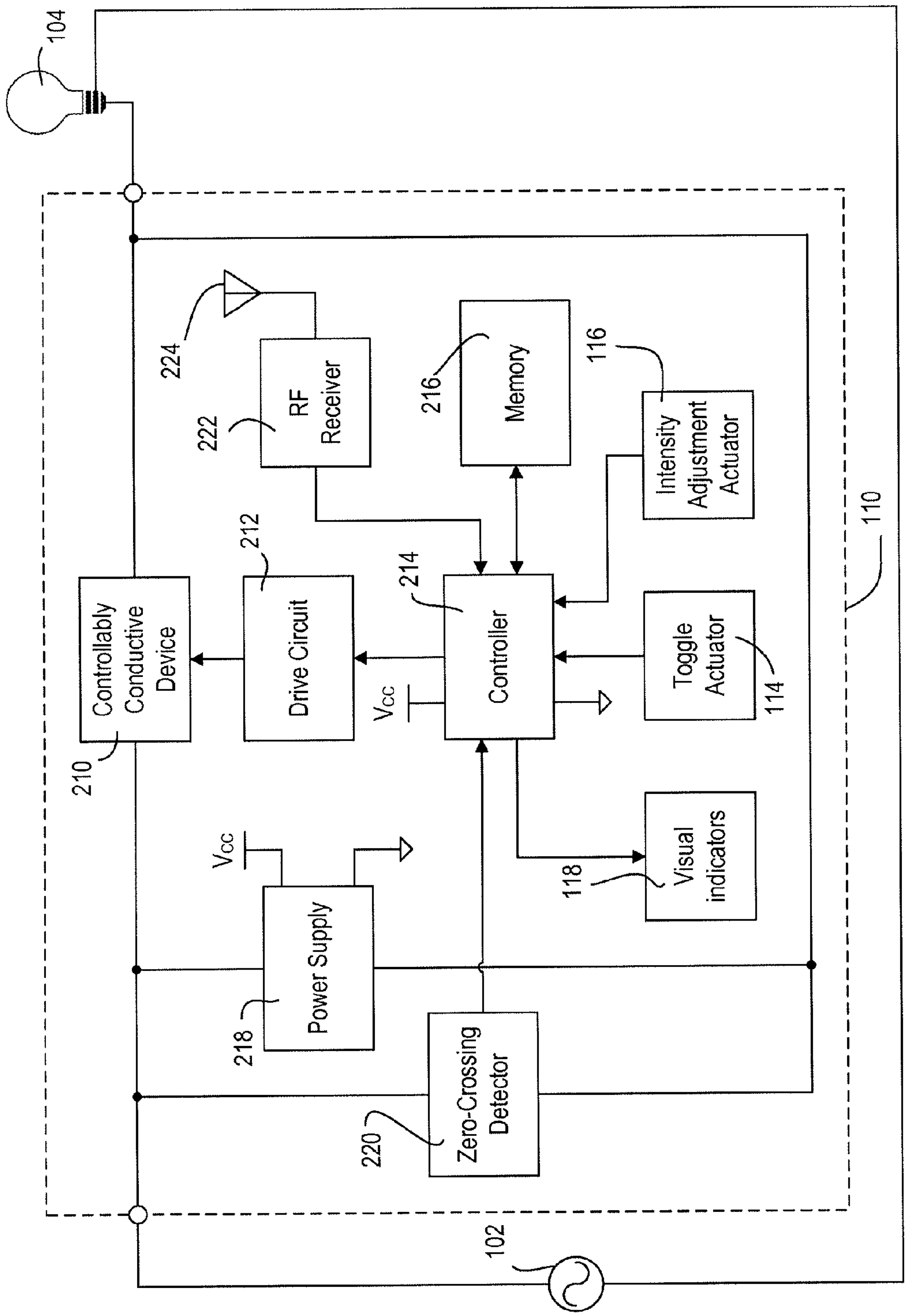
FIG. 3A is a simplified block diagram of the dimmer switch of the lighting control system of FIG. 1.

FIG. 3A is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input provided to the control input will render the controllably conductive device 210 conductive or non-conductive, which in turn controls the power supplied to the lighting load 204.

The drive circuit 212 provides control inputs to the controllably conductive device 210 in response to command signals from a controller 214. The controller 214 may be implemented as a microcontroller, a microprocessor, a programmable logic device (PLD), an application specific integrated circuit (ASIC), a field-programmable gate array (FPGA), or any suitable processing device. The controller 214 receives inputs from the toggle actuator 114 and the intensity adjustment actuator 116 and controls the visual indicators 118. The controller 214 is also coupled to a memory 216 for storage of the preset intensity of lighting load 104 and the serial number of the remote control 120 to which the dimmer switch 110 is associated. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The controller 214 provides the control inputs to the drive circuit 212 to operate the controllably conductive device 210 (i.e., to provide voltage from the AC power supply 102 to the lighting load 104) at predetermined times relative to the zero-crossing points of the AC waveform.

The dimmer switch 110 further comprises an RF receiver 222 and an antenna 224 for receiving the RF signals 106 from the remote control 120. The controller 214 is operable to control the controllably conductive device 210 in response to the packets received via the RF signals 106. Examples of the antenna 224 for wall-mounted dimmer switches, such as the dimmer switch 110, are described in greater detail in U.S. Pat. No. 5,982,103, issued Nov. 9, 1999, and U.S. patent application Ser. No. 10/873,033, filed Jun. 21, 2006, both entitled COMPACT RADIO FREQUENCY TRANSMITTING AND RECEIVING ANTENNA AND CONTROL DEVICE EMPLOYING SAME. The entire disclosures of both patents are hereby incorporated by reference.

Figure 3B:
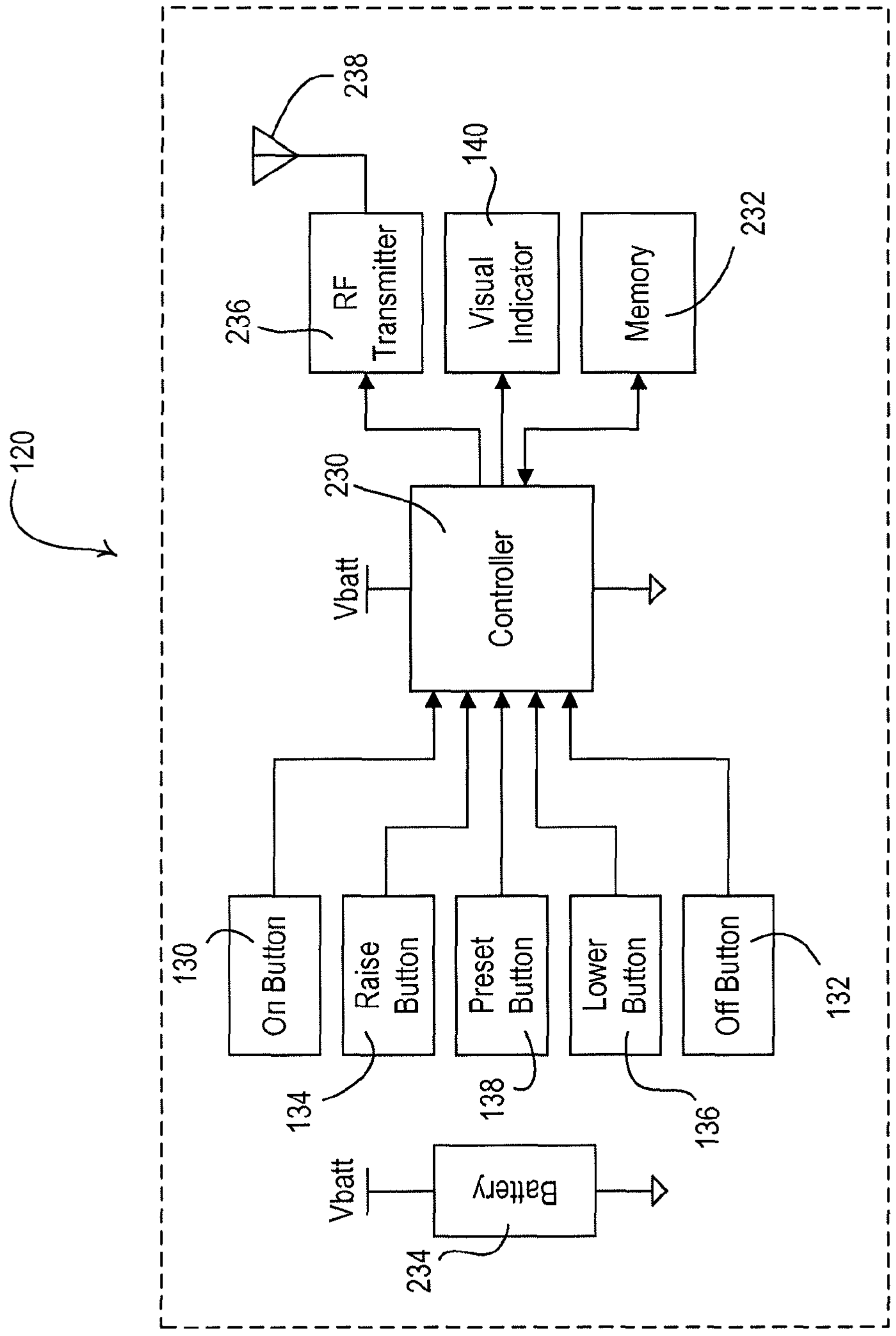
FIG. 3B is a simplified block diagram of the remote control of the lighting control system of FIG. 1.

FIG. 3B is a simplified block diagram of the remote control 120. The remote control 120 comprises a controller 230, which is operable to receive inputs from the buttons 130-138 and to control the visual indicator 140. The remote control 120 comprises a memory 232 for storage of the serial number, i.e., a unique identifier, of the remote control. For example, the serial number comprises a seven-byte number that is programmed into the memory 232 during manufacture of the remote control 120. Two series-coupled batteries 234A, 234B provide a DC voltage $V_{BATT}$ (e.g., 6V) for powering the controller 230, the memory 232, and other low-voltage circuitry of the remote control 120. For example, each of the batteries 234A, 234B may comprise a 3-V lithium coin battery, such as, part number CR2016 manufactured by Energizer. Alternatively, the remote control 120 could comprise, for example, only one 3-V lithium coin battery, such as, part number CR2032 manufactured by Energizer.

The remote control 120 further includes an RF transmitter 236 coupled to the controller 230 and an antenna 238, which may comprise, for example, a loop antenna. In response to an actuation of one of the on button 130, the off button 132, the raise button 134, the lower button 136, and the preset button 138, the controller 230 causes the RF transmitter 236 to transmit a packet to the dimmer switch 110 via the RF signals 106. As previously mentioned, each transmitted packet comprises a preamble, the serial number of the remote control 120, which is stored in the memory 232, and a command indicative as to which of the five buttons was pressed (i.e., on, off, raise, lower, or preset). The remote control 120 ensures that there are 100 msec between each transmitted packet in order to meet the FCC standards.

Alternatively, the RF receiver 222 of the dimmer switch 110 and the RF transmitter of the remote control 120 could both comprise RF transceivers to allow for two-way RF communication between the remote control and the dimmer switch. An example of a two-way RF lighting control systems is described in greater detail in co-pending, commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

The lighting control system 100 provides a simple one-step configuration procedure for associating the remote control 120 with the dimmer switch 110. A user simultaneously presses and holds the on button 130 on the remote control 120 and the toggle button 114 on the dimmer switch 110 to link the remote control 120 and the dimmer switch 110. The user may simultaneously press and hold the off button 132 on the remote control 120 and the toggle button 114 on the dimmer switch 110 to unassociate the remote control 120 with the dimmer switch 110. The configuration procedure for associating the remote control 120 with the dimmer switch 110 is described in greater detail in co-pending commonly-assigned U.S. patent application Ser. No. 11/559,166, filed Nov. 13, 2006, entitled RADIO-FREQUENCY LIGHTING CONTROL SYSTEM, the entire disclosure of which is hereby incorporated by reference.

The lighting control system may comprise a plurality of remote controls 120 that can all be associated with one dimmer switch 110, such that the dimmer switch is responsive to presses of the buttons 130-138 of any of the plurality of remote controls. The user simply needs to repeat the association procedure for each of the plurality of remote controls 120. For example, up to eight remote controls 120 may be associated with one dimmer switch 110.

The preset intensity of the dimmer switch 110 may be programmed from the remote control 120. To program a new preset intensity of the dimmer switch 110, a user first adjusts the intensity of the lighting load 104 to a new (i.e., desired) intensity. The user then presses and holds the preset button 124 of the remote control 120 to cause the dimmer switch to reassign the lighting preset to the new intensity. The procedure for programming the preset intensity is described in greater detail in U.S. patent application Ser. No. 11/713,854, filed Mar. 5, 2007, entitled METHOD OF PROGRAMMING A LIGHTING PRESET FROM A RADIO-FREQUENCY REMOTE CONTROL, the entire disclosure of which is hereby incorporated by reference.

Figure 4A:
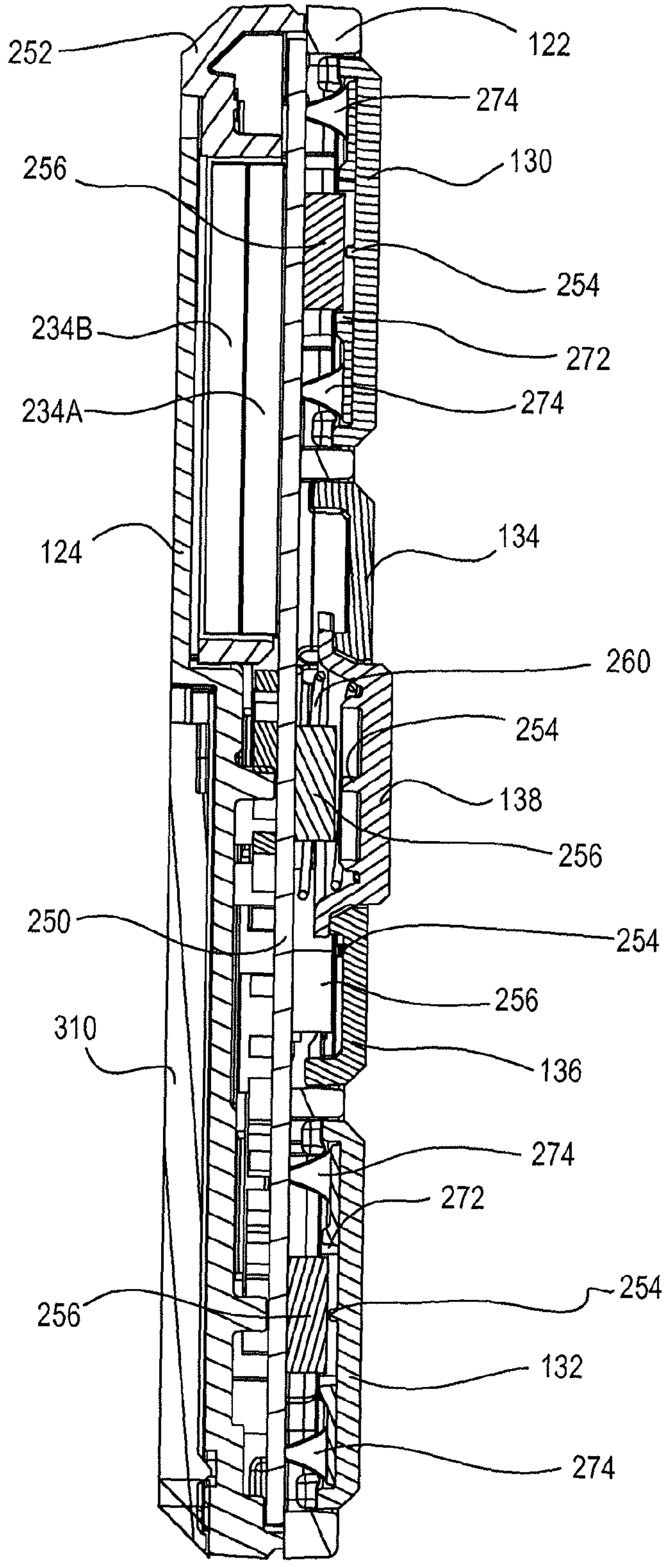
FIG. 4A is a left-side cross-sectional view of the remote control of FIG. 1 taken through the center of the remote control.

FIG. 4A is a left-side cross-sectional view of the remote control 120 taken through the center of the remote control as shown in FIG. 2A. The electrical circuitry of the remote control 120 (as shown in FIG. 3B) is mounted to a printed circuit board (PCB) 250, which is housed between the front enclosure portion 122 and the rear enclosure portion 124. The batteries 234A, 234B are located in a battery enclosure portion 252 and are electrically coupled to the circuitry on the PCB 250. The battery enclosure portion 252 is slidably received in the rear enclosure portion 124, such that the battery enclosure portion may be pulled away from the rear enclosure portion 124 to allow for replacement of the batteries 234A, 234B.

Figure 4C:
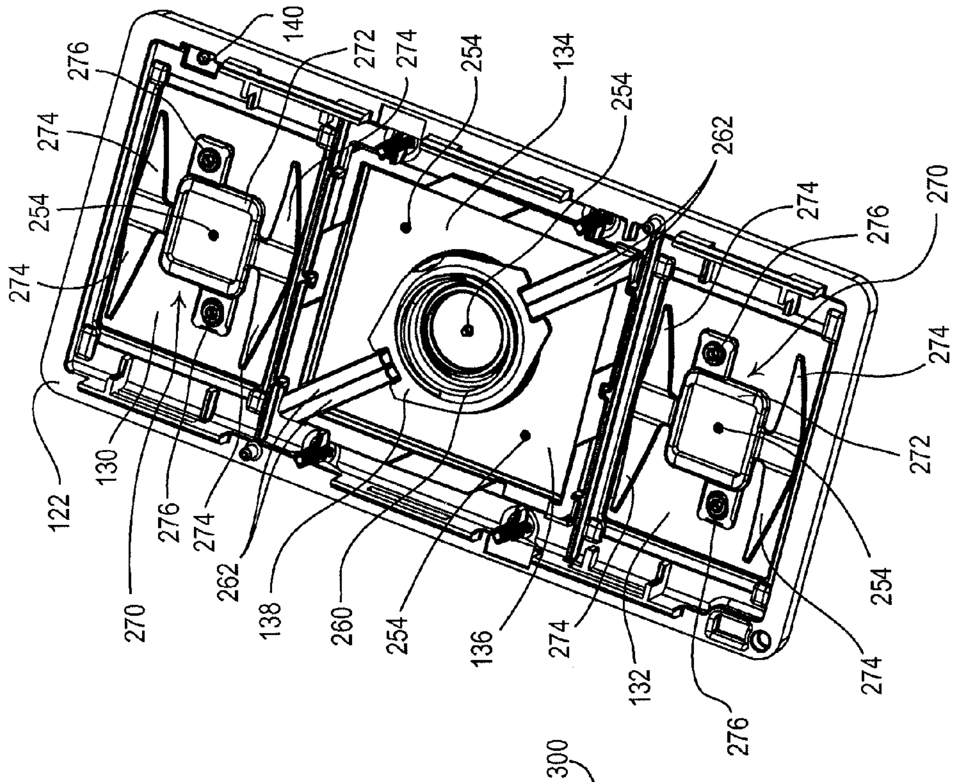
FIG. 4C is a rear perspective view of a front enclosure portion and a plurality of buttons of the remote control of FIG. 1.
Figure 4B:
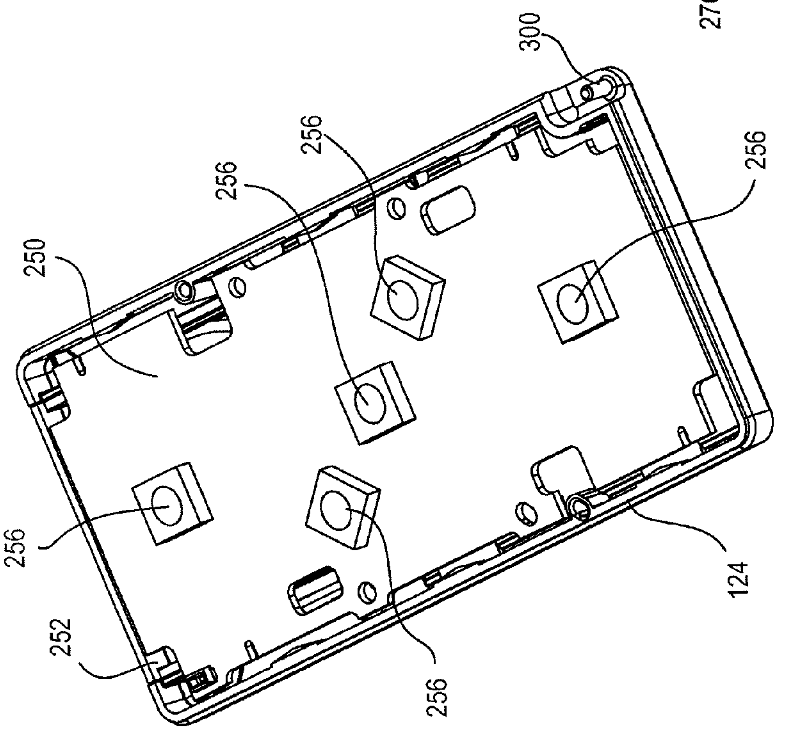
FIG. 4B is a front perspective view of a rear enclosure portion and a printed circuit board of the remote control of FIG. 1.

FIGS. 4B and 4C show the remote control 120 in a partially-disassembled state. Specifically, FIG. 4B is a front perspective view of the rear enclosure portion 124 and the PCB 250, and FIG. 4C is a rear perspective view of the front enclosure portion 122 and the buttons 130-138. The on button 130, the off button 132, the raise button 134, the lower button 136, and preset button 138 comprise actuation posts 254 for actuating mechanical tactile switches 256 mounted on the PCB 250. The remote control 120 comprises a coil spring 260, which is positioned between the preset button 138 and the PCB 250. The coil spring 260 operates to return the preset button 138 to an idle position after the button is actuated. The raise button 134 and the lower button. 136 comprise edges 262 that rest on the PCB 250. The raise and lower buttons 134, 136 are operable to pivot about the edges 262 when the buttons are actuated.

The remote control 120 further comprises return springs 270 connected to the bottom sides of the on button 130 and the off button 132 (as shown in FIG. 4C). The springs 270 each comprise square base portions 272 that are positioned adjacent bottom sides of the on button 130 and the off button 132. The base portions 272 have openings for receiving the corresponding mechanical switches 256 on the PCB 250, such that the actuations posts 254 can actuate the mechanical switches when the on button 130 and the off button 132 are actuated. The return springs 270 comprise legs 274 that extend from the base portions 272 to contact the PCB 250 (as shown in FIG. 4A). When the on button 130 or the off button 132 is pressed, the legs 274 flex allowing the button to be depressed and the respective actuation post 254 to actuate the mechanical switch 256. When the respective button 130, 132 is then released, the return spring 270 forces the button away from the PCB 250 (i.e., returns the button to an idle position). The springs 270 have attachment openings 276 that are, for example, heat-staked to the bottom sides of the on button 130 and the off button 132.

Figure 5:
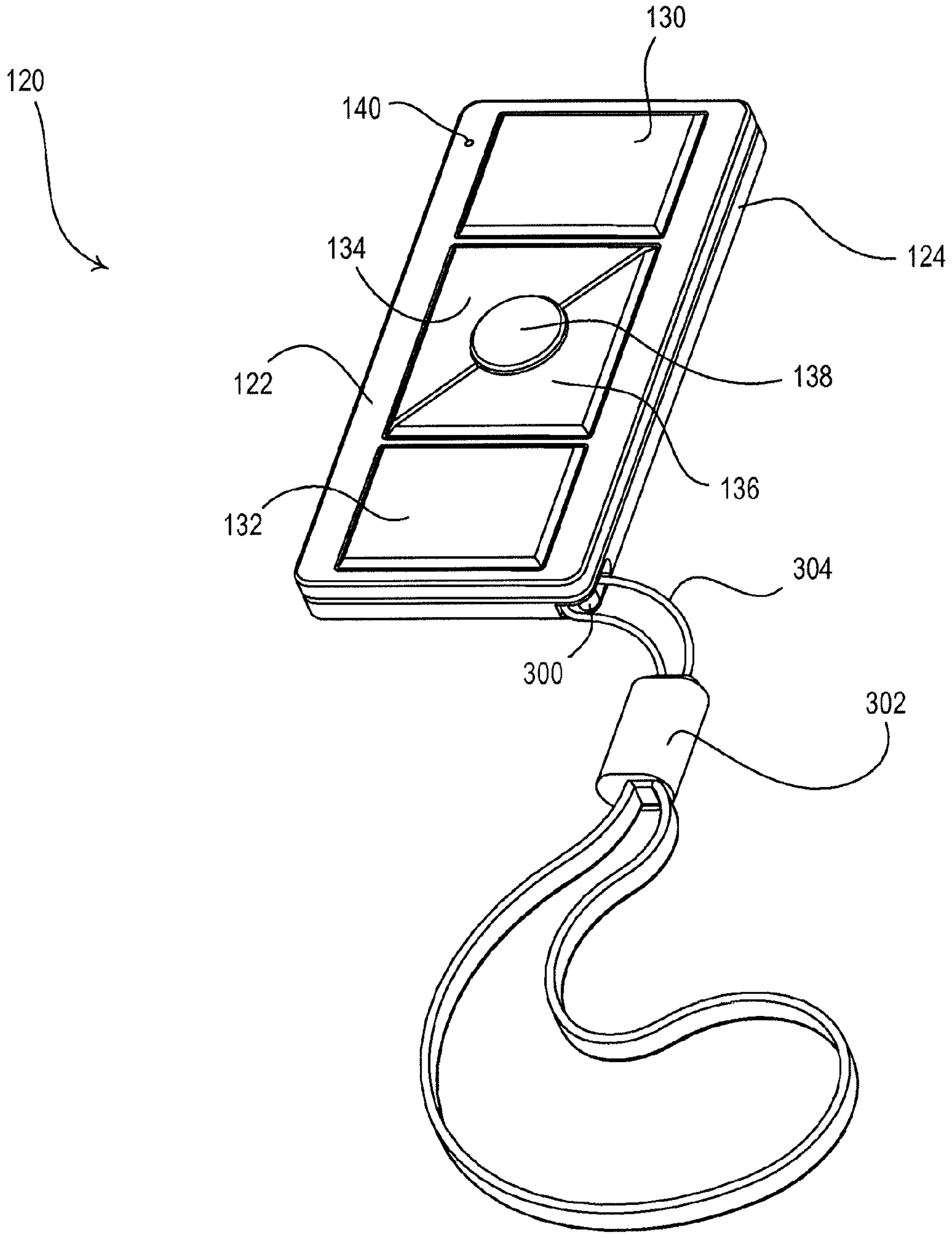
FIG. 5 is a perspective view of the remote control of FIG. 1 including a lanyard.
Figure 6A:
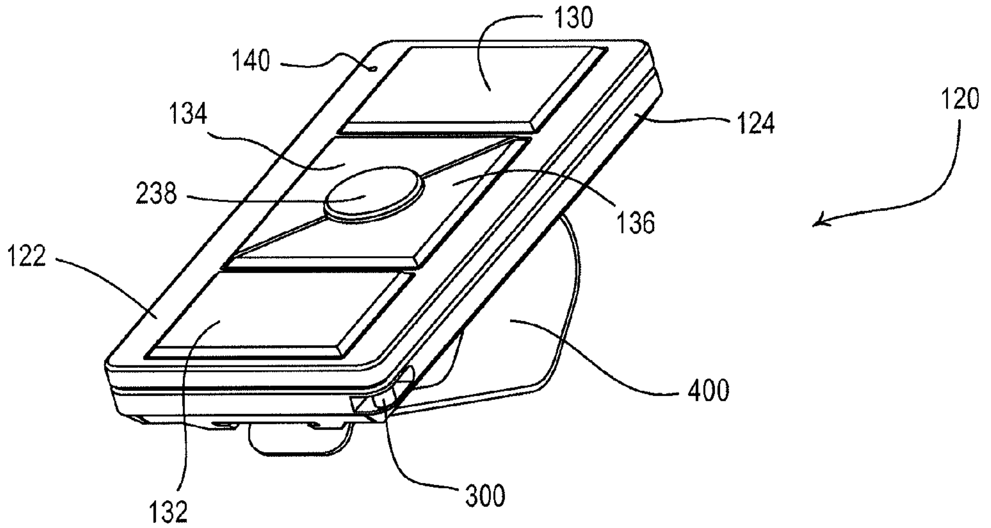
FIG. 6A is a perspective view and FIG. 6B is a right-side view of the remote control of FIG. 1 including a clip.
Figure 6B:
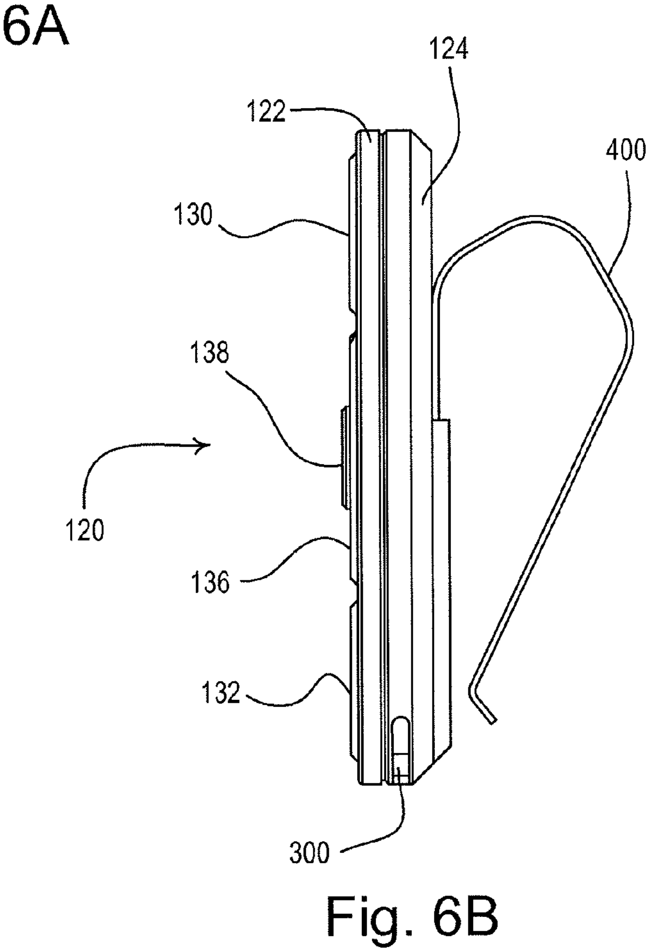
Figure 7:
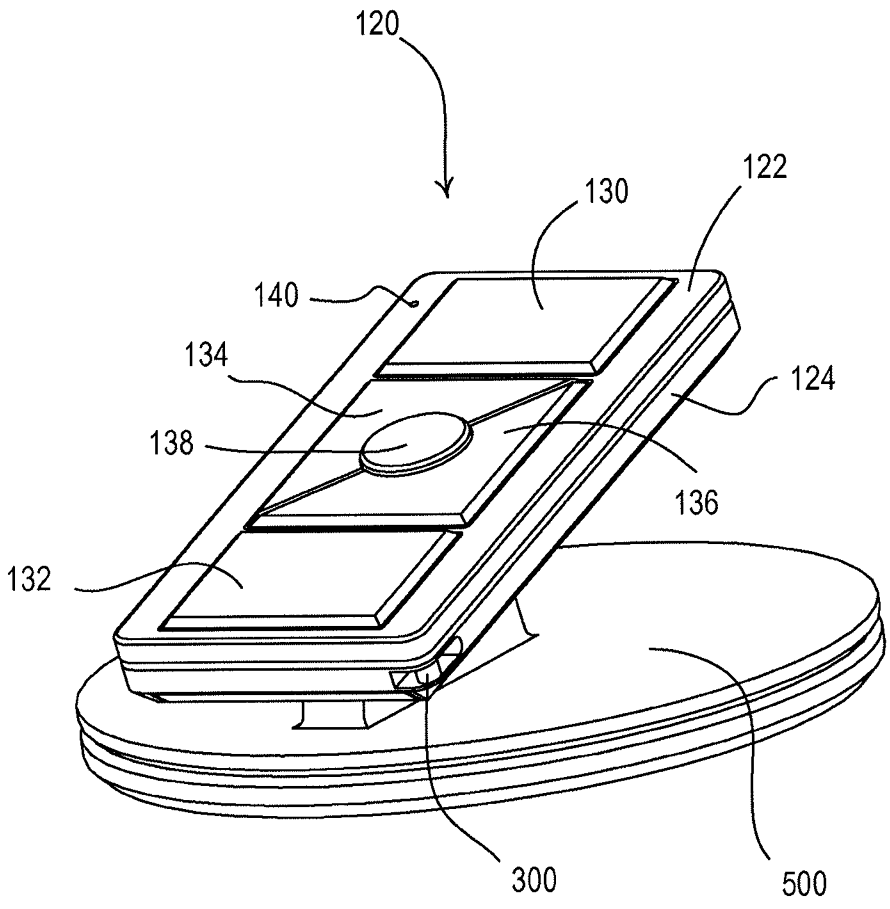
FIG. 7 is a perspective view of the remote control of FIG. 1 mounted to a base portion for supporting the remote control on a horizontal surface.
Figure 8:
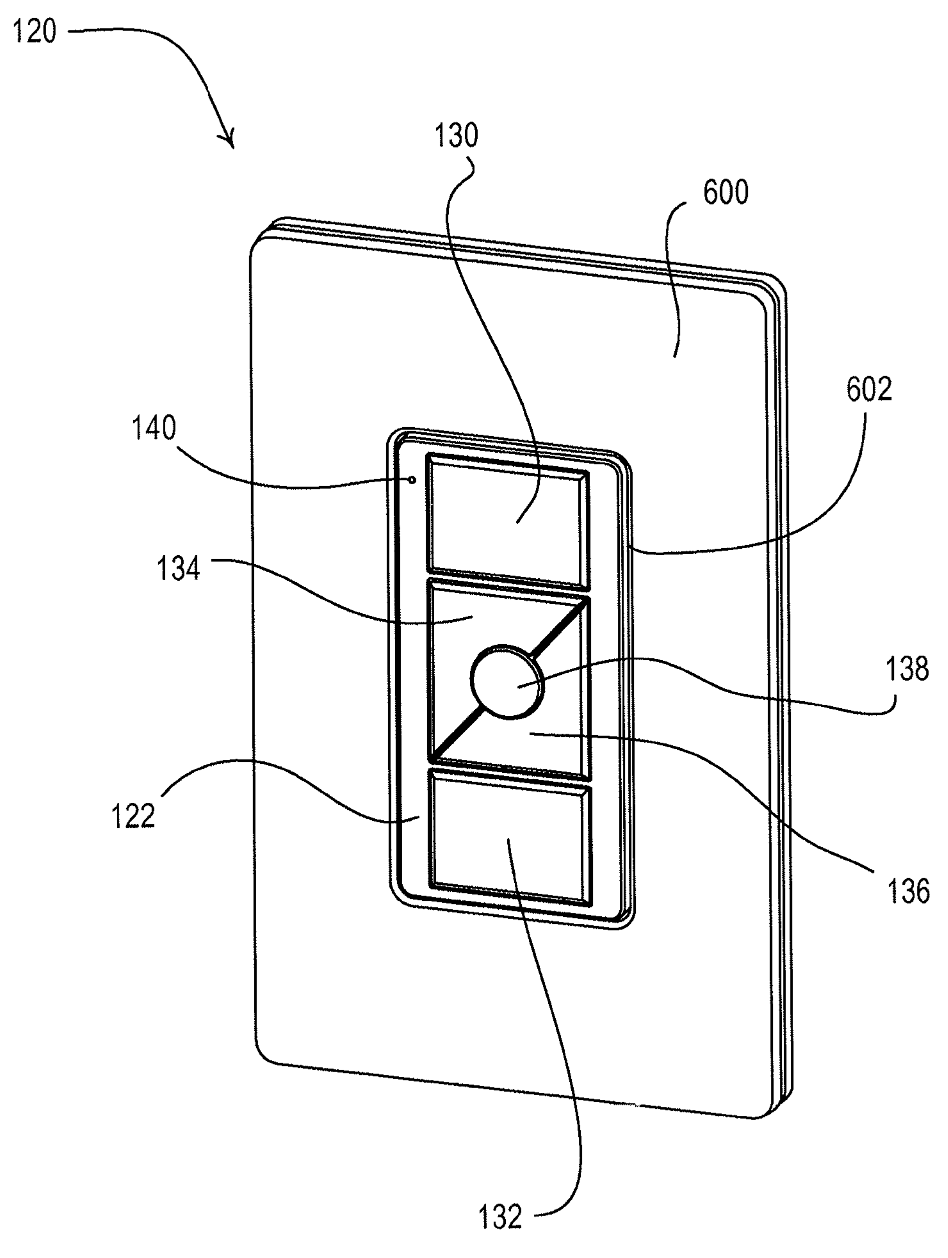
FIG. 8 is a perspective view of the remote control of FIG. 1 mounted to a vertical surface inside an opening of a standard-sized faceplate.

As disclosed herein, the remote control 120 is adapted to provide multiple mounting means. First, the rear enclosure portion 124 comprises an attachment post 300 (as shown in FIG. 4B) that allows a lanyard 302 (or other type of cord) to be attached to the remote control as shown in FIG. 5. Also, the rear enclosure portion 124 is adapted to be connected to a clip 400 as shown in FIGS. 6A and 6B, such that the remote control 120 may be clipped to, for example, a sun visor of an automobile. Further, the rear enclosure portion 124 of the remote control 120 may be connected to a base portion 500 (as shown in FIG. 7) to allow the remote control to rest on a substantially flat horizontal surface, such as, a tabletop. Finally, as shown in FIG. 8, the rear enclosure portion 124 may be mounted on a substantially flat vertical surface, such as, a wall, via a slide-mount plate 610 (FIG. 12), such that the remote control 120 may be received in an opening 602 of a faceplate 600.

Figure 9:
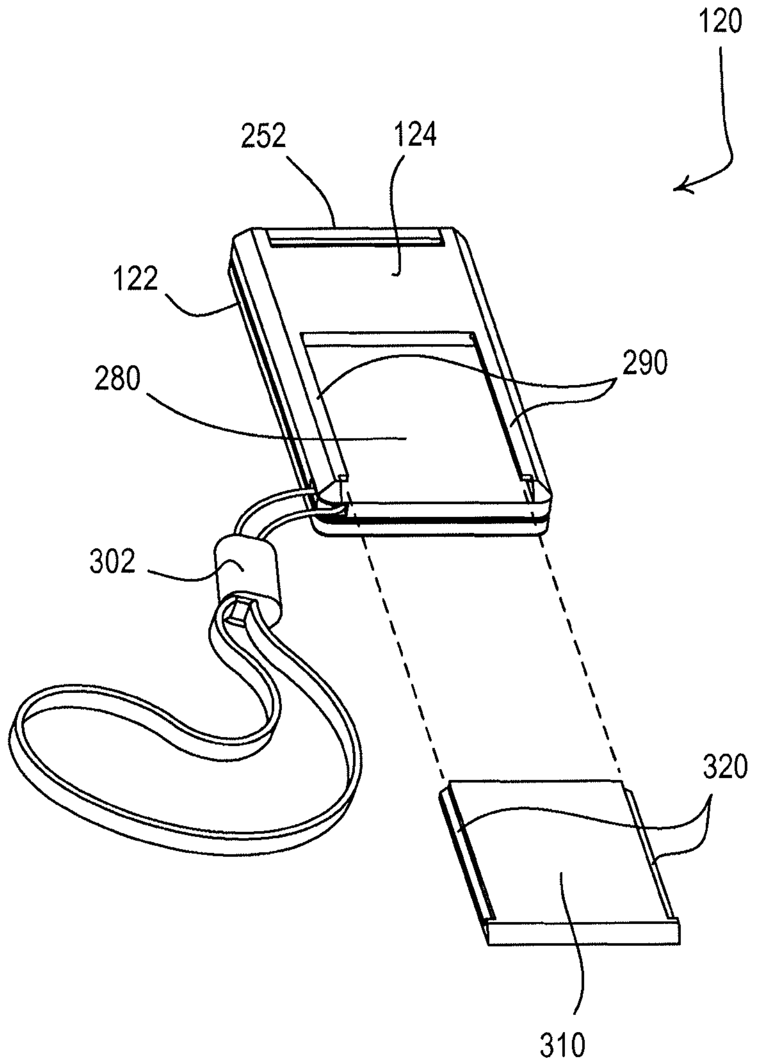
FIG. 9 is a rear perspective view of the remote control of FIG. 1 showing how a slide-receiving portion of the remote control is adapted to receive a plate.
Figure 10:
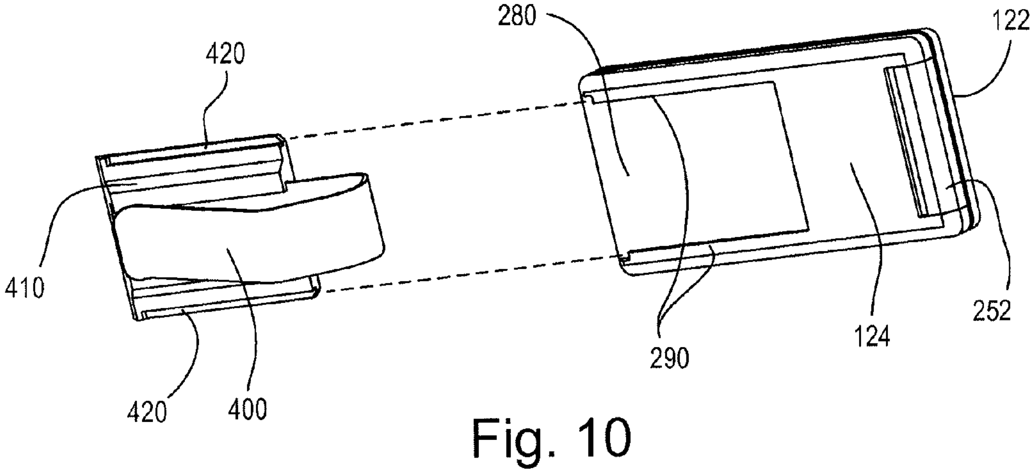
FIG. 10 is a rear perspective view of the remote control of FIG. 1 showing how the slide-receiving portion is adapted to receive a plate to which the clip of FIG. 6A is attached.
Figure 11:
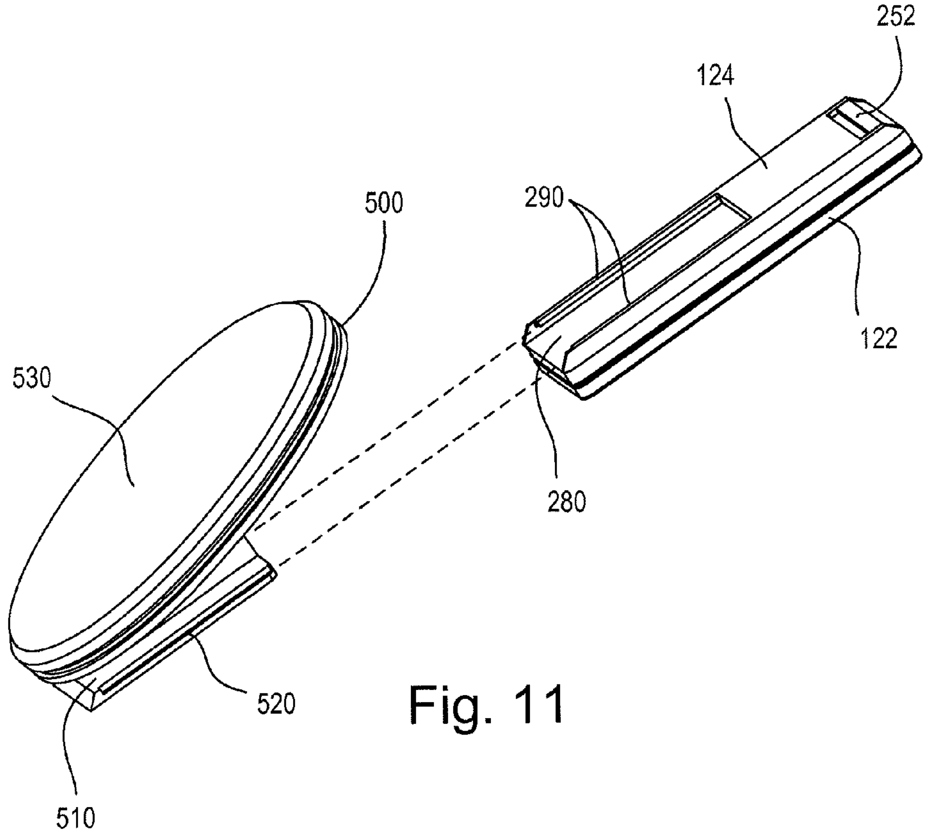
FIG. 11 is a rear perspective view of the remote control of FIG. 1 showing how the slide-receiving portion is adapted to be mechanically coupled to the base portion of FIG. 7.

As shown in FIGS. 9-11, the rear enclosure portion 124 of the remote control 120 comprises a slide-receiving portion 280, which includes two parallel flanges 290. The slide-receiving portion 280 enables the remote control 120 to be coupled to the plurality of different mounting structures (i.e., the lanyard 302, the clip 400, the base portion 500, and the slide-mount clip 610) as shown in FIGS. 5-8.

When the front enclosure portion 122 is connected to the rear enclosure portion 124, the attachment post 300 contacts the front enclosure portion, such that a loop portion 304 of the lanyard 302 may be captured by the attachment post (as shown in FIG. 9). The slide-receiving portion 280 of the rear enclosure portion 124 receives a blank plate 310 when the lanyard 302 is coupled to the attachment post 300. The blank plate 310 includes two parallel slide rails 320 on opposite sides of the plate. The flanges 290 of the slide-receiving portion 280 receive the slide rails 320 to hold the blank plate 310 to the rear enclosure portion 124. The blank plate 310 provides an aesthetic feature by allowing the outer surface of the remote control 120 to have a continuous appearance.

The slide-receiving portion 280 is also adapted to receive a clip assembly, which comprises the clip 400 and a plate portion 410, as shown in FIG. 10. The clip 400 is rigidly connected to the plate portion 410. The plate portion 410 comprises parallel slide rails 420 adapted to be received by the slide-receiving portion 280. Accordingly, the remote control 120 may be clipped to a car visor or similar structure.

Similarly, the base portion 500 includes a plate portion 510 having parallel slide rails 520 adapted to be received by the slide-receiving portion 280 as shown in FIG. 11. The base portion 500 is also characterized by a substantially flat surface 530 on the bottom side of the base portion 500. The substantially flat surface 530 is adapted to rest on a substantially flat horizontal surface, such as a tabletop, such that the remote control 120 may be provided as a tabletop device. The plate portion 510 is may be oriented at an angle to the flat bottom surface 530, such that the remote control 120 is oriented at an angle with respect to the tabletop when the plate portion is receiving within the slide-receiving portion 280.

Figure 12:
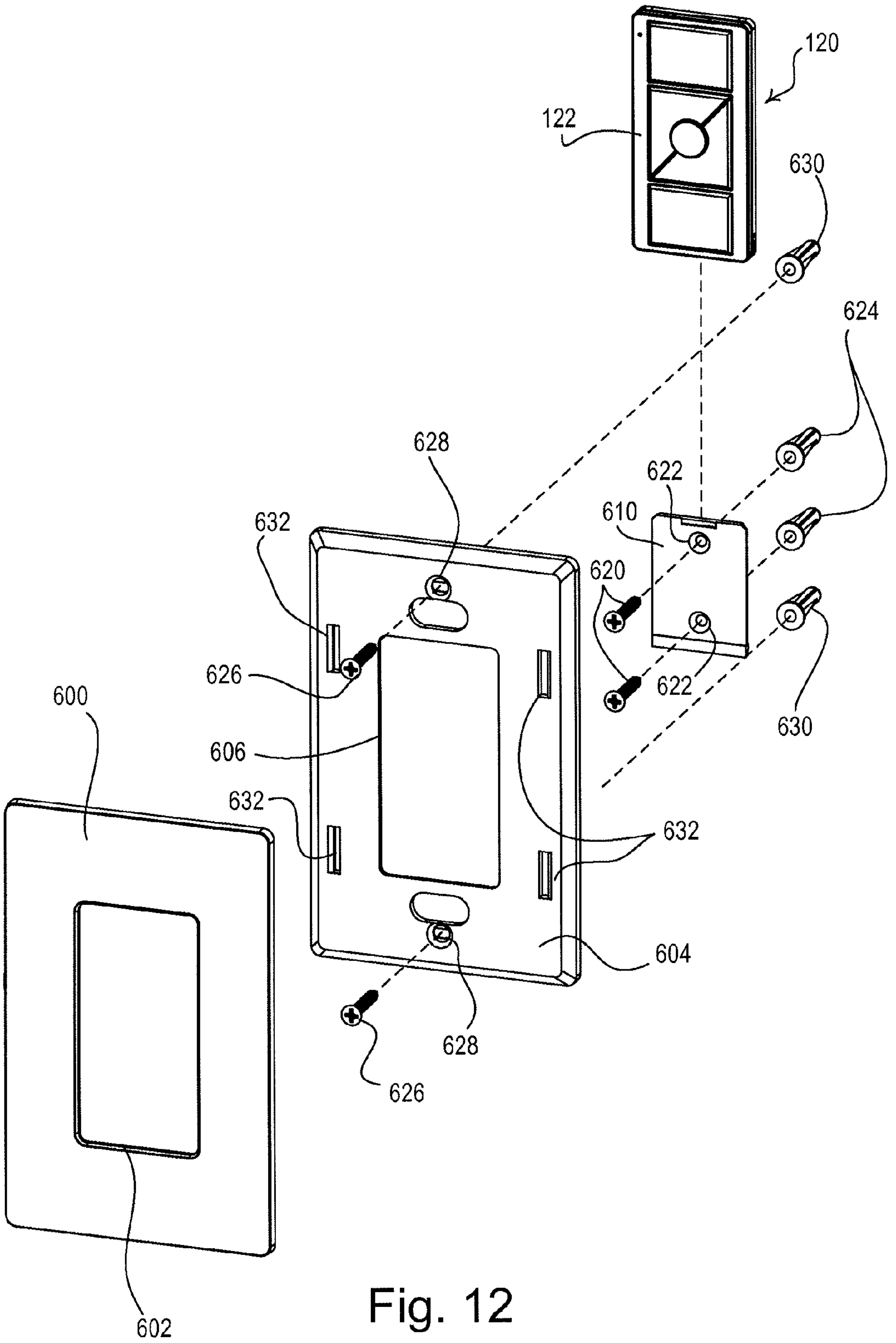
FIG. 12 is a rear perspective view of the remote control of FIG. 1 showing how the slide-receiving portion is adapted to receive a slide-mount plate so that the remote control may be mounted to a vertical surface as shown in FIG. 8.

Finally, the slide-receiving portion 280 is also adapted to coupled to the slide-mount plate 610 as shown in FIG. 12, such that the remote control 120 may be mounted to a wall. Screws 620 are received through attachment holes 622 of the slide-mount plate 610 and attached to anchors 624 provided in the wall. Alternatively, the slide-mount plate 610 could have an adhesive on the side facing the wall for attaching the plate to the wall. An adapter 604 is attached to the wall via screws 626 received through attachment holes 628 and attached to anchors 630 provided in the wall. In order attach the faceplate 600 to the adapter 604, the faceplate includes snaps (not shown) that are coupled to snap openings 632 of the adapter. When the faceplate 600 is coupled to the adapter 604, the on button 130, the off button 132, the raise button 134, the lower button 136, and the preset button 138 of the remote control 120 are provided through and opening 606 of the adapter 604 and the opening 602 of the faceplate. Since the rear enclosure portion 124 slides onto the slide-mount plate 610 and the faceplate 600 mounts around the housing (i.e., the front enclosure portion 122 and the rear enclosure portion 124), the remote control 120 is held in place within the opening 602 of the faceplate 600. The faceplate 600 and the adapter 604 are described in greater detail in U.S. Pat. No. 4,835,343, issued May 30, 1989, entitled TWO-PIECE FACE PLATE FOR WALL BOX MOUNTED DEVICE, the entire disclosure of which is hereby incorporated by reference. Alternatively, the faceplate 600 could comprise attachment holes, such that the faceplate could be adapted to be mounted (i.e., screwed) directly to the wall without the adapter 604.

According to an embodiment of the present invention, the remote control 120 is mounted to the wall via the slide-mount plate 610 before the adapter 604 is attached to the wall. While the remote control 120 is mounted in the opening 606 of the adapter 604, the remote control is prevented from being de-coupled from the slide-mount plate 610 by the adapter 604. Therefore, if the remote control 120 is mounted to a wall in a public space, theft of the remote control is discouraged since the remote control cannot be removed from the installation without the use of a tool (i.e., a screwdriver).

The faceplate 600 may be a standard, "off-the-shelf" faceplate, i.e., the opening 602 defines standard dimensions. For example, the faceplate 600 may comprise a designer-style faceplate defining a standard-sized opening. Per standards set by the National Electrical Manufacturers Association (NEMA), the opening of a designer-style faceplate has a length of 2.630" and a width of 1.310" (NEMA Standards Publication No. WD6, 2001, p. 5). Accordingly, the front enclosure portion 122 and the rear enclosure portion 124 are dimensioned such that the remote control 120 is adapted to fit snugly within the opening 602 of the faceplate 600. The outer periphery of the housing (i.e., the front enclosure portion 122 and the rear enclosure portion 124) has a length and a width slightly smaller than the length and the width of the opening 602 of the faceplate 600, such that the outer periphery of the housing is easily received within the opening of the faceplate. For example, the remote control 120 may have a length of approximately 2.605" and a width of approximately 1.280".

Further, the remote control 120 has a depth d (as shown in FIG. 2B), which is sized such that the front surface of the remote control is flush with or does not protrude very far past the front surface of the faceplate 600. Therefore, the depth d is approximately equal to the distance between the front surface of the faceplate 600 and the wall, e.g., less than approximately 0.5", or specifically, equal to approximately 0.3029".

Figure 13:
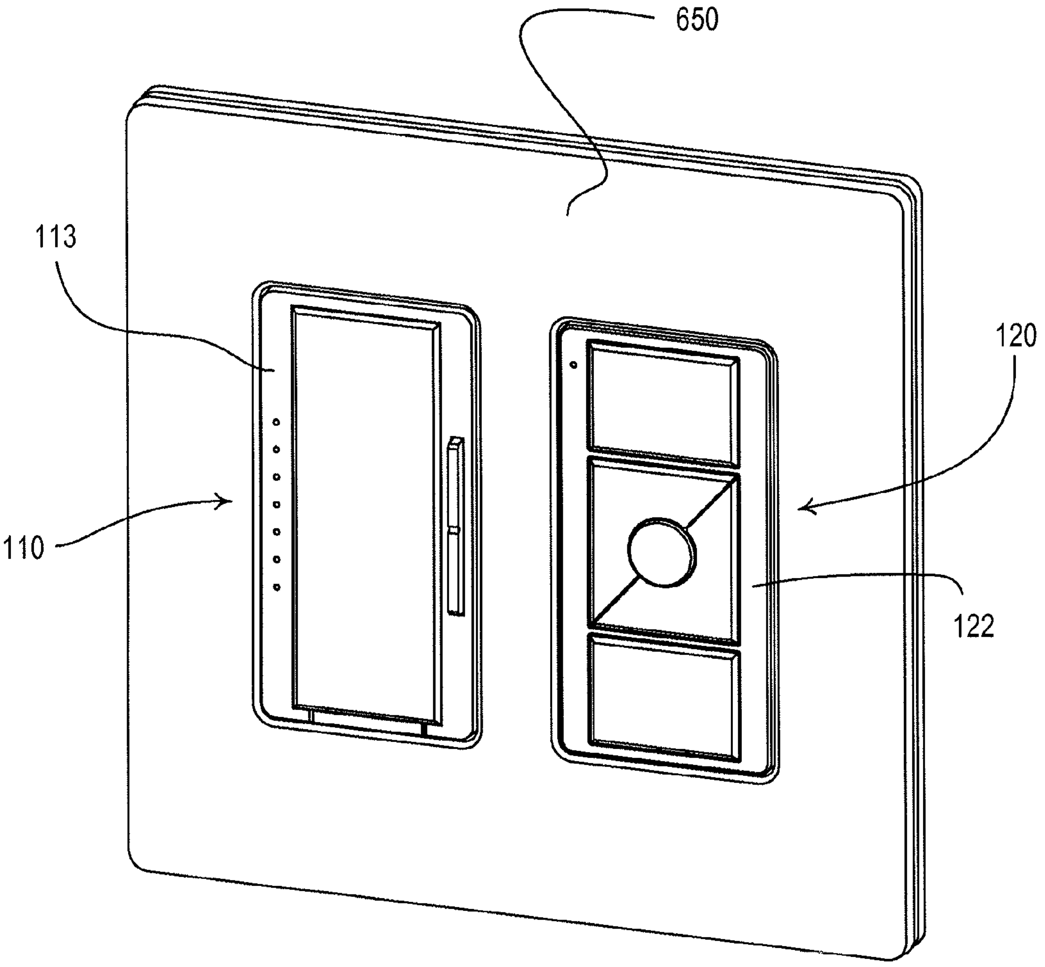
FIG. 13 is a perspective view of the remote control of FIG. 1 ganged next to a designer-style dimmer switch and mounted with a standard designer-style two-gang faceplate.

Accordingly, the remote control 120 may be ganged next to a designer-style load control device (e.g., the dimmer switch 110) with a standard designer-style multi-gang faceplate (e.g., a two-gang faceplate 650) as shown in FIG. 13. The dimmer switch 110 is mounted to a standard electrical wallbox (not shown) that is provided in the wall. The remote control 120 is mounted to the wall immediately adjacent the electrical wallbox of the dimmer switch 110. The two-gang faceplate 650 has first and second designer-style openings 602A, 602B and is mounted such that the bezel 113 of the dimmer switch 110 is provided in the first opening 602A and the remote control 120 is provided in the second opening 602B. The bezel 113 of the dimmer switch 110 has a length and a width slightly smaller than the length and the width of the first opening 602A of the faceplate 650.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A remote control for a radio-frequency (RF) load control system configured to control an electrical load, the remote control comprising:

a housing having a front surface and a rear surface, the front surface having an outer periphery defined by a length and a width, the housing characterized by a depth between the front surface and the rear surface, the housing configured to be held in a user's hand;

an actuator provided at the front surface of the housing;

an RF transmitter contained within the housing; and a controller contained within the housing, the controller configured to cause the RF transmitter to transmit an RF signal for controlling the electrical load in response to an actuation of the actuator when the housing is held in the user's hand, the RF transmitter and the controller adapted to be powered by a battery contained within a volume defined by the length and the width of the front surface and the depth of the housing;

wherein the outer periphery of the front surface of the housing is configured to be received within a standard opening in a plane of a front surface of a faceplate in such a way that an entirety of the front surface of the housing is exposed through the opening in the plane of the front surface of the faceplate when the faceplate is mounted to a substantially vertical surface and the housing is received within the opening in the plane of the front surface of the faceplate, the controller configured to transmit an RF signal for controlling the electrical load in response to an actuation of the actuator when the faceplate is mounted to the vertical surface and the housing is received in the opening in the plane of the front surface of the faceplate.

2. The remote control of claim 1, wherein the length and the width of the housing are slightly smaller than a length and a width of the standard opening of the faceplate, respectively.

3. The remote control of claim 2, wherein the housing is characterized by a depth that is approximately equal to the distance between the front surface of the faceplate and the vertical surface.

4. The remote control of claim 3, wherein the housing is characterized by a depth less than approximately 0.5 inches.

5. The remote control of claim 2, wherein the housing is characterized by a depth that is greater than the distance between the front surface of the faceplate and the vertical surface so as to cause the front surface of the remote control to protrude past the front surface of the faceplate when the faceplate is mounted to the vertical surface and the housing is received within the standard opening in the plane of the front surface of the faceplate.

6. The remote control of claim 2, wherein the length of the housing is approximately 2.605 inches and the width of the housing is approximately 1.280 inches.

7. The remote control of claim 2, wherein the length and the width of the standard opening of the faceplate are those of a designer-style opening as set by a standard published by the National Electrical Manufacturers Association.

8. The remote control of claim 1, further comprising:

a mounting plate configured to be fastened to the vertical surface;

wherein the housing of the remote control is configured to be attached to the mounting plate, the housing comprising a slide-receiving portion having two parallel flanges arranged to slidingly receive two parallel slide rails of the mounting plate, the parallel slide rails extending along opposite sides of the mounting plate.

9. The remote control of claim 1, further comprising:

a base portion having a flat surface for resting on a horizontal surface;

wherein the housing is adapted to be connected to the base portion.

10. The remote control of claim 1, wherein the remote control is prevented from being removed from the standard opening of the faceplate when the faceplate is mounted to the substantially vertical surface and the housing is received within the standard opening of the faceplate.

11. The remote control of claim 1, wherein the outer periphery of the housing is configured to fit within a first standard opening of a multigang faceplate when the multigang faceplate is mounted to the substantially vertical surface and the remote control is mounted adjacent to an electrical wallbox.

12. The remote control of claim 1, wherein the controller is configured to include a command for controlling a lighting load in an RF signal transmitted by the RF transmitter.

13. The remote control of claim 1, wherein the controller is configured to include a command for controlling a motorized window treatment in an RF signal transmitted by the RF transmitter.

14. The remote control of claim 1, wherein the battery comprises at least one coin battery.

15. The remote control of claim 1, wherein the RF transmitter and the controller only receive power from the battery.

16. The remote control of claim 1, wherein the remote control has no wire connections to the electrical load.

17. A remote control for a radio-frequency (RF) load control system configured to control an electrical load, the remote control comprising:

an actuator configured to be actuated by a user;

an RF transmitter configured to transmit RF signals; and a controller for causing the RF transmitter to transmit an RF signal for controlling the electrical load in response to an actuation of the actuator; and a housing configured to enclose the RF transmitter and the controller, the housing having a front surface in which the actuator is located and a rear surface, the front surface having an outer periphery defined by a length and a width, the housing characterized by a depth between the front surface and the rear surface, the RF transmitter and the controller adapted to be powered by a battery contained within a volume defined by the length and the width of the front surface and the depth of the housing;

wherein the outer periphery of the front surface of the housing is configured to be received within a standard opening in a plane of a front surface of a faceplate in such a way that an entirety of the front surface of the housing is exposed through the opening in the plane of the front surface of the faceplate when the faceplate is mounted to a substantially vertical surface and the housing is received within the opening in the plane of the front surface of the faceplate, the controller configured to transmit an RF signal for controlling the electrical load in response to an actuation of the actuator when the faceplate is mounted to the vertical surface and the housing is received in the opening in the plane of the front surface of the faceplate; and wherein the housing of the remote control is configured to be removed from the opening of the faceplate, the controller configured to cause the RF transmitter to transmit an RF signal for controlling the electrical load in response to an actuation of the actuator when the housing is removed from the opening of the faceplate.

18. The remote control of claim 17, further comprising:

a base portion having a flat surface for resting on a horizontal surface;

wherein the housing is adapted to be connected to the base portion when the housing is removed from the opening of the faceplate.

19. The remote control of claim 18, wherein the base portion further comprises:

an angled portion for receiving the housing of the remote control wherein when the housing is connected to the base portion, the remote control is orientated at an angle with respect to the flat surface of the base portion.

20. The remote control of claim 17, the controller is configured to transmit the RF signal for controlling the electrical load in response to an actuation of the actuator when the housing is held in a user's hand.

21. The remote control of claim 17, wherein the length and the width of the housing are slightly smaller than a length and a width of the standard opening of the faceplate, respectively.

22. A remote control for a radio-frequency (RF) load control system configured to control an electrical load, the remote control comprising:

a housing having a front surface and a rear surface, the front surface having an outer periphery defined by a length and a width, the housing characterized by a depth between the front surface and the rear surface, the housing configured to be held in a user's hand;

an actuator provided at the front surface of the housing;

an RF transmitter contained within the housing; and a controller contained within the housing, the controller configured to cause the RF transmitter to transmit an RF signal for controlling the electrical load in response to an actuation of the actuator when the housing is held in the user's hand; and a battery enclosure portion within the housing, the battery enclosure portion configured to receive a battery to power the RF transmitter and the controller, the battery enclosure portion contained within a volume defined by the length and the width of the front surface and the depth of the housing;

wherein the outer periphery of the front surface of the housing is configured to be received within a standard opening in a plane of a front surface of a faceplate in such a way that an entirety of the front surface of the housing is exposed through the opening in the plane of the front surface of the faceplate when the faceplate is mounted to a substantially vertical surface and the housing is received within the opening in the plane of the front surface of the faceplate, the controller configured to transmit an RF signal for controlling the electrical load in response to an actuation of the actuator when the faceplate is mounted to the vertical surface and the housing is received in the opening in the plane of the front surface of the faceplate.

23. The remote control of claim 22, wherein the length and the width of the housing are slightly smaller than a length and a width of the standard opening of the faceplate, respectively.

* * * * *